US008936114B2

(12) United States Patent
Thomas et al.

(10) Patent No.: US 8,936,114 B2
(45) Date of Patent: Jan. 20, 2015

(54) COMPOSITES COMPRISING CLUSTERED REINFORCING AGENTS, METHODS OF PRODUCTION, AND METHODS OF USE

(75) Inventors: Jeffrey Gerard Thomas, Magnolia, TX (US); Brian Atkins, The Woodlands, TX (US)

(73) Assignee: Halliburton Energy Services, Inc., Houston, TX (US)

(*) Notice: Subject to any disclaimer, the term of this patent is extended or adjusted under 35 U.S.C. 154(b) by 427 days.

(21) Appl. No.: 13/349,910

(22) Filed: Jan. 13, 2012

(65) Prior Publication Data
US 2013/0180786 A1  Jul. 18, 2013

(51) Int. Cl.
*E21B 10/46* (2006.01)
*C09K 3/14* (2006.01)

(52) U.S. Cl.
CPC ................................ *C09K 3/1427* (2013.01)
USPC .................... 175/420.2; 175/405.1; 175/433; 175/434

(58) Field of Classification Search
CPC .............................. E21B 10/46; C09K 3/1427
USPC ........... 175/374, 405.1, 420.2, 425, 433, 434, 175/435; 75/240
See application file for complete search history.

(56) References Cited

U.S. PATENT DOCUMENTS

| 4,585,064 A | 4/1986 | Graham et al. |
| 4,670,501 A | 6/1987 | Dymond et al. |
| 4,780,274 A | 10/1988 | Barr |
| 5,249,627 A | 10/1993 | Harms et al. |
| 5,288,297 A * | 2/1994 | Ringwood ...................... 51/293 |
| 5,733,649 A | 3/1998 | Kelley et al. |
| 5,733,664 A | 3/1998 | Kelley et al. |
| 5,833,000 A | 11/1998 | Weaver et al. |
| 5,853,048 A | 12/1998 | Weaver et al. |
| 5,880,382 A * | 3/1999 | Fang et al. ...................... 75/236 |
| 6,287,360 B1 | 9/2001 | Kembaiyan et al. |
| 6,439,309 B1 | 8/2002 | Matherly et al. |
| 6,582,819 B2 | 6/2003 | McDaniel et al. |
| 6,677,426 B2 | 1/2004 | Noro et al. |
| 6,682,580 B2 | 1/2004 | Findeisen et al. |
| 6,984,454 B2 | 1/2006 | Majagi |
| 7,153,575 B2 | 12/2006 | Anderson et al. |
| 7,250,069 B2 | 7/2007 | Kembaiyan et al. |
| 7,384,443 B2 | 6/2008 | Mirchandani |

(Continued)

FOREIGN PATENT DOCUMENTS

WO   WO2013106381 A1   7/2013

OTHER PUBLICATIONS

International Search Report and Written Opinion for PCT/US2013/020757 dated Apr. 29, 2013.

(Continued)

*Primary Examiner* — Cathleen Hutchins
(74) *Attorney, Agent, or Firm* — McDermott Will & Emery LLP; Alan Bryson

(57) ABSTRACT

A composite may generally include a substantially continuous binder phase and a first reinforcing agent cluster infiltrated by the binder phase, the first reinforcing agent cluster comprising a plurality of first reinforcing agent particles. A drill bit may include at least one cutting element for engaging a formation and a bit body, at least a portion of said drill bit being a composite that includes a substantially continuous binder phase and a first reinforcing agent cluster infiltrated by the binder phase.

26 Claims, 11 Drawing Sheets

(56) References Cited

U.S. PATENT DOCUMENTS

| | | |
|---|---|---|
| 7,475,743 B2 | 1/2009 | Liang et al. |
| 7,810,587 B2 | 10/2010 | Gerk et al. |
| 8,016,056 B2 | 9/2011 | Viswanadham et al. |
| 8,016,057 B2 | 9/2011 | Deng et al. |
| 2005/0274517 A1 | 12/2005 | Blauch et al. |
| 2005/0277554 A1 | 12/2005 | Blauch et al. |
| 2007/0131422 A1 | 6/2007 | Gatlin et al. |
| 2007/0131425 A1 | 6/2007 | Gatlin et al. |
| 2007/0175669 A1 | 8/2007 | Liang et al. |
| 2007/0277646 A1 | 12/2007 | Terry et al. |
| 2008/0282618 A1 | 11/2008 | Lockwood |
| 2009/0260893 A1 | 10/2009 | Sheng et al. |
| 2009/0283335 A1 | 11/2009 | Lockwood et al. |
| 2010/0230173 A1 | 9/2010 | Xia et al. |

OTHER PUBLICATIONS

German, R.M.; Powder Characterization; Powder Metallurgy Science, Metal Powder Industries Federation, 1984.

Askeland, Dr. Donald; Class Handout entitled Met 307 Metal Casting, 1999.

* cited by examiner

COMPOSITES COMPRISING CLUSTERED REINFORCING AGENTS, METHODS OF PRODUCTION, AND METHODS OF USE

BACKGROUND

The present invention generally relates to porous reinforcing agent clusters and composites thereof for downhole tools and related methods.

Downhole tool, e.g., drill bits, have been formed of particle reinforced metal matrix composites. The performance characteristics, e.g., strength, toughness, wear resistance, erosion resistance, and thermal resistance, of a downhole tool are thought to depend on the reinforcing agents in the metal matrix, e.g., tungsten carbide particulates dispersed in a copper alloy. Generally, larger reinforcing agents are thought to impart wear resistance to the downhole tool, while smaller reinforcing agents are thought to impart strength to the downhole tool. However, larger reinforcing agents are thought to reduce strength of the downhole tool, while smaller reinforcing agents are thought to reduce wear resistance of the downhole tool. Therefore, approaches to simultaneously enhance seemingly inversely related performance characteristics, e.g., strength and wear resistance, have been undertaken.

One approach where some success has been observed includes using bimodal size distributions of reinforcing agents to form composites by traditional methods. This approach is believed to yield homogeneously distributed bimodal reinforcing agents through a drill bit body, for instance.

A second more complex approach includes heterogeneous distributions of bimodal reinforcing agents having discrete regions of reinforcing agents. Historically, these discrete regions have been achieved by first creating solid composite particles of a large number of reinforcing agents in a metal matrix. Then, these solid composite particulates are then incorporated into a final composite just as the particulate reinforcing agents would be incorporated in standard procedures. This approach yields solid composite particles distributed homogenously throughout the drill bit body. However, this approach oftentimes introduces phase boundaries at the interfaces between the solid composite particles and the matrix of the drill bit body. If the interfaces are not properly formed or have defects, then the interfaces often become points of failure in the final downhole tool, e.g., the drill bit. Defects in the downhole tool can significantly reduce the performance characteristics of the downhole tool. For example, defects can cause: increased wearing thereby reducing the lifetime of the bit, uneven wearing thereby reducing the lifetime and efficacy of the drill bit, and/or reduced strength thereby allowing for chipping or cracking during operation of the drill bit. As the solid composite particles are large by design to create the discrete regions with a multitude of reinforcing agent clusters, the defects at the interfaces of the solid composite particles and matrix of the drill bit body can be larger and more detrimental than a defect between the drill bit matrix and a single reinforcing agent cluster.

The ability to create discrete regions of reinforcing agents while minimize the size and occurrence of failure points would be of value to one skilled in the art.

SUMMARY OF THE INVENTION

The present invention generally relates to porous reinforcing agent clusters and composites thereof for downhole tools and related methods.

In some embodiments, the present invention provides a composite comprising: a substantially continuous binder phase and a first reinforcing agent cluster infiltrated by the binder phase, the first reinforcing agent cluster comprising a plurality of first reinforcing agent particles.

In some embodiments, the present invention provides a composite comprising: a plurality of layers wherein at least a portion of a first layer comprises a substantially continuous binder phase and a first reinforcing agent cluster that comprises a plurality of first reinforcing agent particles and at least a portion of the binder phase.

In some embodiments, the present invention provides a method comprising: providing a porous reinforcing agent cluster comprising a plurality of first reinforcing agent particles and a bonding material; and combining the porous reinforcing agent cluster and a binder material; and forming a composite comprising a substantially continuous binder phase and a first reinforcing agent cluster, wherein at least a portion of the binder phase infiltrates the reinforcing agent cluster.

In some embodiments, the present invention provides a method comprising: providing a first reinforcing agent particle, a second reinforcing agent particle, and a binder material; forming a first porous reinforcing agent cluster comprising the first reinforcing agent particle and a bonding material; and forming a composite from the first porous reinforcing agent cluster, the second reinforcing agent particle, and the binder material.

In some embodiments, the present invention provides a method comprising: mixing a plurality of first reinforcing agent particles and a high-temperature bonding material; and heating to a temperature at or above a softening temperature for the high-temperature bonding material thereby yielding a plurality of porous reinforcing agent clusters having at least one path for infiltration.

In some embodiments, the present invention provides a porous reinforcing agent cluster comprising: a high-temperature bonding material; a plurality of first reinforcing agent particles in a cluster configuration mechanically bound at a plurality of contact points by the high-temperature bonding material; and wherein the porous reinforcing agent cluster comprises at least one path for infiltration.

In some embodiments, the present invention provides a drill bit comprising: a bit body, at least a portion of which comprises a composite that comprises a substantially continuous binder phase and a first reinforcing agent cluster, wherein the binder phase infiltrates the first reinforcing agent cluster; and at least one cutting element for engaging a formation.

In some embodiments, the present invention provides a method comprising: providing a drill bit that comprises at least one cutting element for engaging a formation and a bit body, at least a portion of the bit body comprising a composite that comprises a substantially continuous binder phase and a first reinforcing agent cluster, wherein the binder phase infiltrates the first reinforcing agent cluster; and drilling at least a portion of a wellbore in a subterranean formation with the drill bit.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
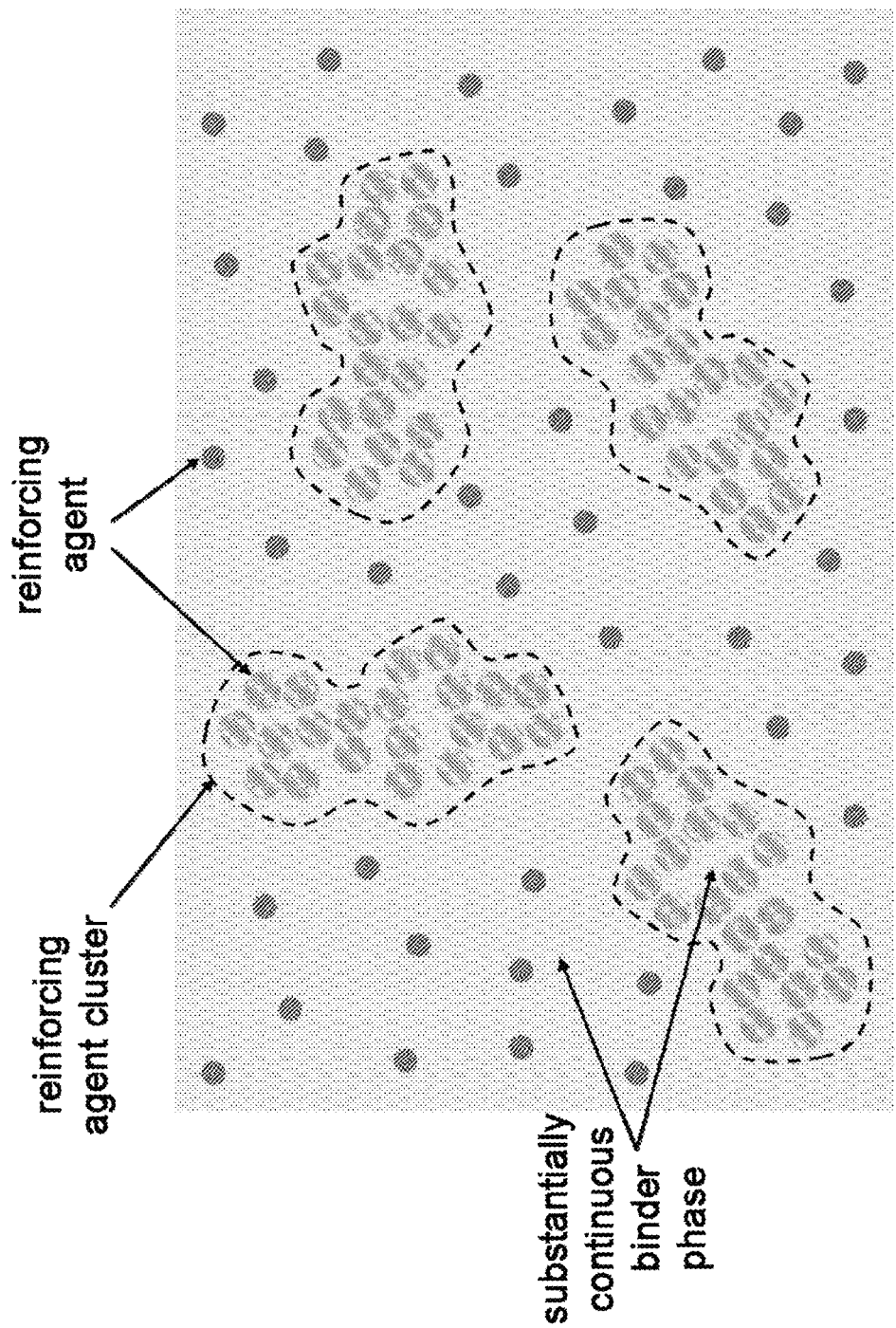
FIG. 1 provides a nonlimiting illustration of a composite comprising reinforcing agent clusters according to the present invention.

The present invention generally relates to porous reinforcing agent clusters and composites thereof for downhole tools and related methods.

The present invention provides porous reinforcing agent clusters that when used in composites for downhole tools may provide tailorable performance characteristics, e.g., strength, toughness, wear resistance, erosion resistance, and thermal resistance. For clarity, the term "porous reinforcing agent cluster," as used herein, refers to the reinforcing agent cluster prior to being incorporated into a composite structure. The term "reinforcing agent cluster," as used herein, refers to the reinforcing agent after incorporation into in a composite.

The porous reinforcing agent clusters of the present invention allow for infiltration of a binder material thereby yielding composites with a substantially continuous binder phase that infiltrates the reinforcing agent clusters. As used herein, the term "infiltration," "infiltrating," and derivatives thereof refer to permeating a liquid into and/or through the article(s) of interest, e.g., porous reinforcing agent clusters and composite precursor (described further herein). It should be noted that infiltration may occur with the assistance of gravity, capillary action, pressure, or any combination thereof.

The substantially continuous binder phase and reinforcing agent clusters may synergistically provide enhanced performance characteristics in that the clustering improves performance characteristics without producing phase boundaries which, as discussed above, are often points of failure. Further, the substantially continuous binder phase and reinforcing agent clusters may allow for improvement of some performance characteristics, such as wear resistance, with minimal sacrifice of other performance characteristics, such as toughness. By way of nonlimiting example, strength and erosion resistance are inversely related, the present compositions may allow for increasing strength while minimally decreasing erosion resistance, or vise versa.

In some embodiments, porous reinforcing agent clusters may comprise, consist essentially of, or consist of a plurality of reinforcing agent particles and at least one bonding material. Said bonding material may form mechanical bonds between reinforcing agent particles at a plurality of contact points. One skilled in the art, with the benefit of this disclosure, should understand that contact points between reinforcing agent particles include points of contact with a bonding material between. As used herein, the terms "mechanical bond," "mechanically bonded," and the like refer to a physical connection that holds two particles together. Mechanical bonds may be rigid or flexible depending on the bonding material. Mechanical bonding may or may not involve chemical bonding, metallurgical bonding, and/or alloying. It should be understood that as used herein, the terms "particle" and "particulate" may be used interchangeably and include all known shapes of materials, including spherical and/or ovular, substantially spherical and/or ovular, discus and/or platelet, flake, ligamental, acicular, fibrous, polygonal (such as cubic), randomly shaped (such as the shape of crushed rocks), faceted (such as the shape of crystals), or any hybrid thereof.

In some embodiments, porous reinforcing agent clusters may comprise two or more types of reinforcing agent particles. The two or more reinforcing agent particles may vary by shape, size, chemical composition, microstructure, crystal structure, or any combination thereof. By way of nonlimiting example, diamond blends may comprise a ratio of large diamond particles to small diamond particles ranging from about 70:30 to about 90:10.

Suitable reinforcing agent particles may be particles of metals, metal alloys, metal carbides, metal nitrides, diamonds, superalloys, and the like, or any combination thereof. Examples may include, but not be limited to, nitrides, silicon nitrides, boron nitrides, cubic boron nitrides, natural diamonds, synthetic diamonds, cemented carbide, spherical carbides, low alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, iron alloys, nickel alloys, chromium alloys, HASTELLOYS® (nickel-chromium containing alloys, available from Haynes International), INCONELS® (austenitic nickel-chromium containing superalloys, available from Special Metals Corporation), WASPALOYS® (austenitic nickel-based superalloys, RENE® alloys (nickel-chrome containing alloys, available from Altemp Alloys, Inc.), HAYNES® alloys (nickel-chromium containing superalloys, available from Haynes International), INCOLOYS® (iron-nickel containing superalloys, available from Mega Mex), MP98T (a nickel-copper-chromium superalloy, available from SPS Technologies), TMS alloys, CMSX® alloys (nickel-based superalloys, available from C-M Group), N-155 alloys, any mixture thereof, or any combination thereof. In some embodiments, reinforcing agent particles may be coated. By way of nonlimiting example, reinforcing agents comprising diamond may be coated with titanium.

Suitable reinforcing agent particles may be particles may be reinforcing agent particle precursors. By way of nonlimiting example, carbon, e.g., graphite and fullerenes, may be catalyzed to diamond reinforcing agents.

It should be noted that when "about" is provided below in reference to a number in a numerical list, the term "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, reinforcing agent particles may have a size of about 1 nanometer or greater in at least one dimension. In some embodiments, reinforcing agent particles may range in size in at least one dimension from a lower limit of about 1 nm, 10 nm, 100 nm, 500 nm, 1 micron, 25 microns, 50 microns, 100 microns, or 200 microns to an upper limit of about 1 mm, 750 microns, 500 microns, 250 microns, 100 microns, 25 microns, or 1 micron, and wherein the size in at least one dimension may range from any lower limit to any upper limit and encompass any subset therebetween.

One skilled in the art, with the benefit of this disclosure, should understand the combinations of shape, size, chemical composition, microstructure, crystal structure, or any combination thereof of reinforcing agent particles to impart desired performance characteristics. By way of nonlimiting example, wear-resistant clusters may comprise larger size reinforcing agent particles as compared to tough clusters that may comprise smaller size reinforcing agent particles. By way of another nonlimiting example in polycrystalline diamond cutters, large size reinforcing agents provide more abrasion resistance while smaller size reinforcing agents provide more wear resistance.

Bonding materials may include high-temperature bonding materials, low-temperature bonding materials, or a combination thereof. In some embodiments, bonding materials may include high-temperature bonding materials at least partially coated with low-temperature bonding materials. As used herein, the term "coating," and the like, does not imply any particular degree of coating on the particulate. In particular, the terms "coat" or "coating" do not imply 100% coverage by the coating on the particulate. In some embodiments, bonding materials may comprise a combination of two or more bonding materials.

High-temperature bonding materials, as used herein, are compositions having softening temperatures of about 260° C. 500° F.) and above. As used herein, the term "softening temperature" refers to the temperature above which a material becomes pliable, which is typically below the melting point of the material. Examples of suitable high-temperature bonding materials may include, but not be limited to, copper, nickel, cobalt, iron, molybdenum, chromium, manganese, tin, zinc, lead, silicon, tungsten, boron, phosphorous, gold, silver, palladium, indium, titanium, any mixture thereof, any alloy thereof, and any combination thereof. Nonlimiting examples may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, and the like. Further, high-temperature bonding materials may include diamond catalysts, e.g., iron, cobalt, and nickel.

In some embodiments, high-temperature bonding materials may have a size about 75% smaller than the reinforcing agent particles. In some embodiments, high-temperature bonding materials may have a size of about 5 microns or greater in at least one dimension. In some embodiments, high-temperature bonding materials may range in size in at least one dimension from a lower limit of about 5 microns, 10 microns, 25 microns, or 50 microns to an upper limit of about 250 microns, 100 microns, or 50 microns, and wherein the size in at least one dimension may range from any lower limit to any upper limit and encompass any subset therebetween.

Low-temperature bonding materials, as used herein, are compositions capable of forming mechanical bonds below about 260° C. (500° F.). Examples of suitable low-temperature bonding materials may include, but not be limited to, polymers, resins, tackifiers, or any combination thereof.

Suitable polymers may include, but not be limited to, polymers comprising at least one monomeric unit of acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyl-triethylammonium chloride, N-vinyl pyrrolidone, vinylphosphonic acid, and methacryloyloxyethyl trimethylammonium sulfate, hydroxyethylacrylate, hydroxymethylacrylate, hydroxyethylmethacrylate, N-hydroxymethylacrylamide, N-hydroxymethyl-methacrylamide, ethylene glycol, propylene glycol, ethylene glycol acrylate, ethylene glycol methacrylate, propylene glycol acrylate, propylene glycol methacrylate, and derivatives thereof. As used herein, the term "polymer" generally refers to homopolymers, copolymers, and blend polymers. Any combination of polymers may be used.

The term "resin" as used herein refers to any of numerous physically similar polymerized synthetics or chemically modified natural resins including thermoplastic materials and thermosetting materials. One type of suitable resin is a two-component, epoxy-based resin comprising a liquid hardenable resin component and a liquid hardening agent component. Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and combinations thereof. In some embodiments, the hardenable resin may comprise a urethane resin. Examples of suitable urethane resins may comprise a polyisocyanate component and a polyhydroxy component. Examples of suitable hardenable resins, including urethane resins, that may be suitable for use in the methods of the present invention include those described in U.S. Pat. Nos. 6,582,819; 4,585,064; 6,677,426; and 7,153,575, the entire disclosures of which are herein incorporated by reference. Examples of the hardening agents that can be used in the liquid hardening agent component include, but are not limited to, cyclo-aliphatic amines, such as piperidine, piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; and 2-ethyl-4-methyl imidazole; tris(dimethylaminomethyl) phenol; di(methylaminomethyl)phenol; 4,4'-diaminodiphenyl sulfone; and combinations thereof. The chosen hardening agent often effects the range of temperatures over which a hardenable resin is able to cure.

Other suitable resins are furan-based resins. Suitable furan-based resins include, but are not limited to, furfuryl alcohol resins, furfural resins, combinations of furfuryl alcohol resins and aldehydes, and a combination of furan resins and phenolic resins.

Still other suitable resins are phenolic-based resins. Suitable phenolic-based resins include, but are not limited to, terpolymers of phenol, phenolic formaldehyde resins, and a combination of phenolic and furan resins. In some embodiments, a combination of phenolic and furan resins may be preferred.

Yet another suitable resin-type material is a phenol/phenol formaldehyde/furfuryl alcohol resin comprising about 5% to about 30% phenol, of about 40% to about 70% phenol formaldehyde, about 10% to about 40% furfuryl alcohol, about 0.1% to about 3% of a silane coupling agent, and about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, and 3-glycidoxypropyltrimethoxysilane. Suitable surfactants include, but are not limited to, an ethoxylated nonyl phenol phosphate ester, combinations of one or more cationic surfactants, and one or more nonionic surfactants and an alkyl phosphonate surfactant.

Another suitable resin-type material is sodium silicates, e.g., liquid glass.

Suitable tackifiers may include, but not be limited to, non-aqueous tackifying agents (e.g., polyamides, silyl-modified polyamides, polyesters, polycarbonates, silyl-modified polyamide compounds, polycarbamates, urethanes, natural resins, shellac, any derivative thereof, and the like, and any copolymer thereof), aqueous tackifying agents (e.g., acrylic acid polymers, acrylic acid ester polymers, acrylic acid derivative polymers, acrylic acid homopolymers, acrylic acid ester homopolymers, poly(methyl acrylate), poly(butyl acrylate), poly(2-ethylhexyl acrylate)), acrylic acid ester copolymers, methacrylic acid derivative polymers, methacrylic acid homopolymers, methacrylic acid ester homopolymers, poly (methyl methacrylate), poly(butyl methacrylate), poly(2-ethylhexyl methacrylate)), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate copolymers, any derivative thereof, and the like, any copolymer thereof, and any combination thereof. Examples of suitable non-aqueous tackifying agents are described in U.S. Pat. Nos. 5,853,048 and 5,833,000 and U.S. Patent Publication Nos. 2007/0131425 and 2007/0131422, the relevant disclosures of which are herein incorporated by reference. Examples of suitable silyl-modified polyamides and methods of making such compounds are described in U.S. Pat. No. 6,439,309, the entire disclosure of which is incorporated by reference. Examples of suitable aqueous tackifying agents can be found in U.S. Patent Publication Nos. 2005/0277554 and 2005/0274517, the entire disclosures of which are hereby incorporated by reference. Additionally, suitable tackifying agents are described in U.S. Pat. Nos. 5,249,627 and 4,670,501, the entire disclosures of which are incorporated by reference.

Suitable liquid silicates may include, but not be limited to, liquid glass, sodium silicate, and the like.

The amount of bonding material to use relative to the reinforcing agent particulates may vary based on the composition of the bonding material and the reinforcing agent particles and/or the size of the reinforcing agent particles. The lower limit should be a sufficient amount to bond the particles together, and the upper limit should be so as not to hinder subsequent infiltration (as described below). In some embodiments, the bonding material may be present in the porous reinforcing agent clusters from a lower limit of about 0.5%, 1%, 2%, 5%, or 10% to an upper limit of about 50%, 40%, 30%, 20%, 15%, or 10% by volume, wherein the amount of bonding material may range from any lower limit to any upper limit and encompass any subset therebetween.

In some embodiments, porous reinforcing agent clusters may comprise at least one path for infiltration. In some embodiments, porous reinforcing agent clusters may comprise, consist essentially of, or consist of a plurality of reinforcing agent particles, at least one bonding material, and at least one path for infiltration. In some embodiments, porous reinforcing agent clusters may comprise at least one path for binder phase infiltration. As used herein, the term "binder phase infiltration" and derivatives thereof refer to permeating a binder material in liquid-form into and/or through the article(s) of interest, e.g., porous reinforcing agent clusters and composite precursor (described further herein).

In some embodiments, forming porous reinforcing agent clusters may involve mixing a plurality of reinforcing agent particles and bonding materials. In some embodiments, forming porous reinforcing agent clusters may involve at least partially coating reinforcing agent particles with bonding materials. When the bonding materials comprises a high-temperature bonding material, forming porous reinforcing agent clusters may involve heating to a temperature at or above the softening temperature for the bonding material. When the bonding material comprises a low-temperature bonding material, forming porous reinforcing agent clusters may involve curing the bonding material to strengthen the mechanical bonding. Depending on the desired density of the porous reinforcing agent clusters, shaking and/or vibrating the reinforcing agent particles and a bonding material may or may not be involved in forming the porous reinforcing agent clusters.

After reinforcing agent particles are bound into porous reinforcing agent clusters, some embodiments may further involve crushing the porous reinforcing agent clusters to smaller cluster sizes, screening the reinforcing agents to separate cluster sizes, mixing separated cluster sizes, or any combination thereof. It should be noted that crushing, as used herein, refers to breaking into smaller pieces and does not necessarily imply a specific action. Crushing may include, but not be limited to, blending, milling, and the like. In some embodiments, crushing may involve a mortar and pestle, a ball mill, a rod miller, and the like. One skilled in the arts with the benefit of this disclosure should understand the appropriate method of crushing to achieve the desired porous reinforcing agent cluster size.

Porous reinforcing agent clusters may have any desired size. In some embodiments, porous reinforcing agent clusters may have at least one dimension greater than about 10 nanometers. In some embodiments, porous reinforcing agent clusters may have at least one dimension ranging from a lower limit of about 10 nm, 100 nm, 1 micron, 10 microns, 100 microns, 250 microns, 500 microns, 750 microns, or 1 mm to an upper limit of about 5 mm, 2 mm, 1 mm, 500 microns, 100 microns, or 10 microns, wherein the at least one dimension may range from any lower limit to any upper limit and encompass any subset therebetween.

Figure 2:
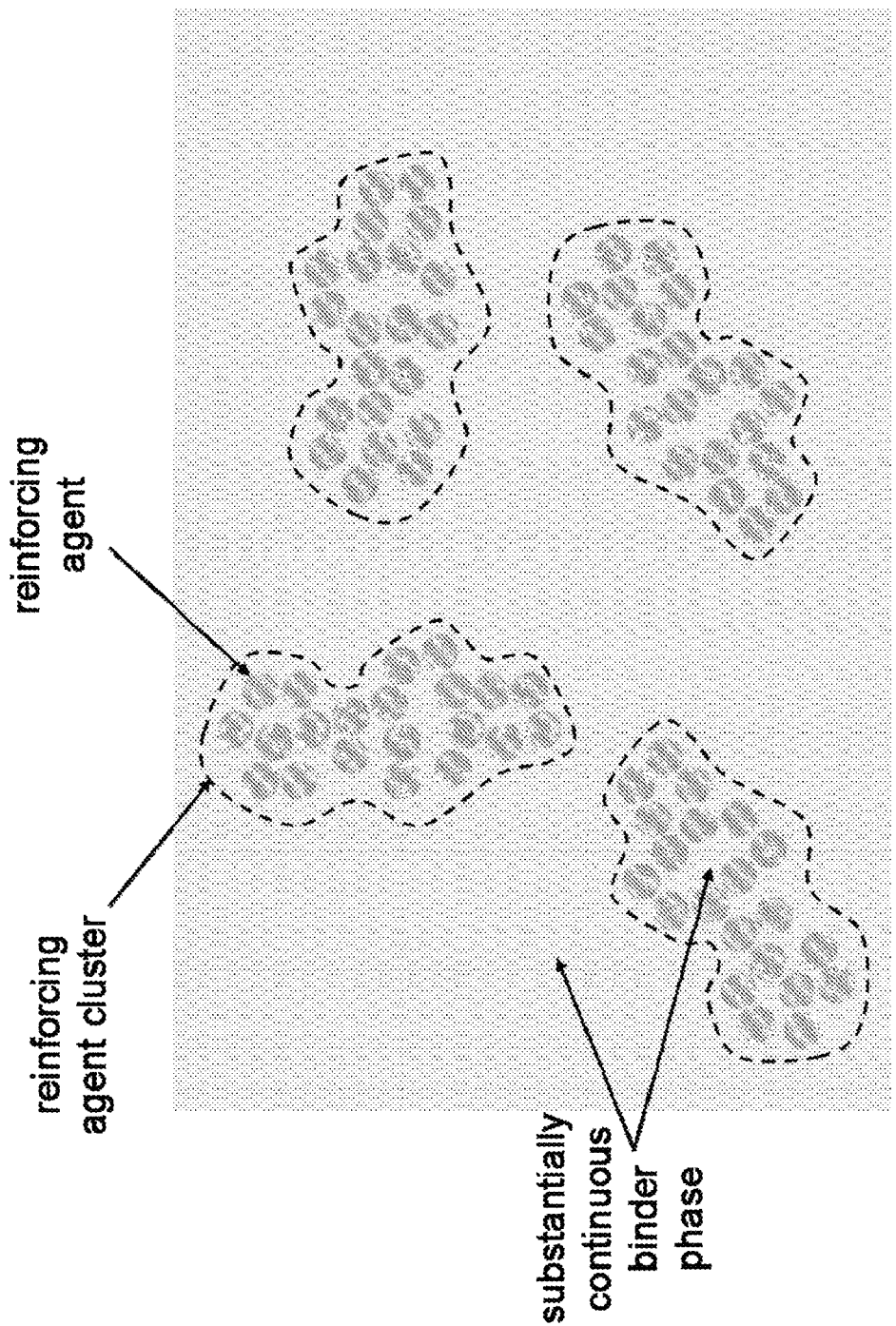
FIG. 2 provides a nonlimiting illustration of a composite comprising reinforcing agent clusters according to the present invention.

In some embodiments, a composite may comprise, consist essentially of, or consist of a substantially continuous binder phase and reinforcing agent clusters comprising reinforcing agent particles, a nonlimiting example of which is shown in FIG. 2. In some embodiments, a composite may comprise, consist essentially of, or consist of a substantially continuous binder phase and reinforcing agent clusters infiltrated with the binder phase, the reinforcing agent clusters comprising reinforcing agent particles. It should be noted that as used herein, a substantially continuous binder phase refers to the binder phase being substantially continuous through the composite including the reinforcing agent clusters.

The binder phase may be formed from a binder material. Examples of suitable binder materials may include, but not be limited to, copper, nickel, cobalt, iron, molybdenum, chromium, manganese, tin, zinc, lead, silicon, tungsten, boron, phosphorous, gold, silver, palladium, indium, any mixture thereof, any alloy thereof, and any combination thereof. Nonlimiting examples may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, and the like. Examples of commercially available binder materials may include, but not be limited to, VIRGIN BINDER® 453D (copper-manganese-nickel-zinc, available from Belmont Metals, Inc.); copper-tin-manganese-nickel and copper-tin-manganese-nickel-iron grades 516, 519, 523, 512, 518, and 520 available from ATI Firth Sterling; or any combination thereof. In some embodiments, a binder material may have a melting point less than the melting point of the reinforcing agent particles of the reinforcing agent clusters. In some embodiments, a binder material may have a melting point less than the melting point of iron, cobalt, nickel, or alloys thereof. In some embodiments, a binder material may have a melting point less than about 1540° C. (2800° F.), less than about 1480° C. (2700° F.), or less than about 1150° C. (2100° F.). In some embodiments, a binder material may have a melting point ranging from a lower limit of about 815° C. (1500° F.), 870° C. (1600° F.), 955° C. (1750° F.), 1090° C. (2000° F.), or 1230° C. (2250° F.) to an upper limit of about 1540° C. (2800° F.), 1480° C. (2700° F.), 1370° C. (2500° F.), 1230° C. (2250° F.), or 1150° C. (2100° F.), and wherein the melting point may range from any lower limit to any upper limit and encompass any subset therebetween. In some embodiments the binder material may be in the form of a powder, particles, chunks, blocks, and the like. One skilled in the art, with the benefit of this disclosure, should understand that the form of the binder material may impact the distribution of the various components in the final composite.

In some embodiments, the binder material may have the same chemical composition as the bonding material of the porous reinforcing agent cluster.

In some embodiments, a composite may comprise, consist essentially of, or consist of a substantially continuous binder phase; reinforcing agent clusters comprising a plurality of first reinforcing agent particles; and a plurality of second reinforcing agent particles substantially not incorporated in the reinforcing agent clusters. In some embodiments, a composite may comprise, consist essentially of, or consist of reinforcing agent clusters infiltrated with a substantially continuous binder phase and a plurality of second reinforcing agent particles in the binder phase but substantially not incorporated in the reinforcing agent clusters. It should be noted that modifiers like first, second, third, and so on are used herein for clarity to differentiate the components of the composite and do not imply any structural or compositional limitations.

Figure 3:
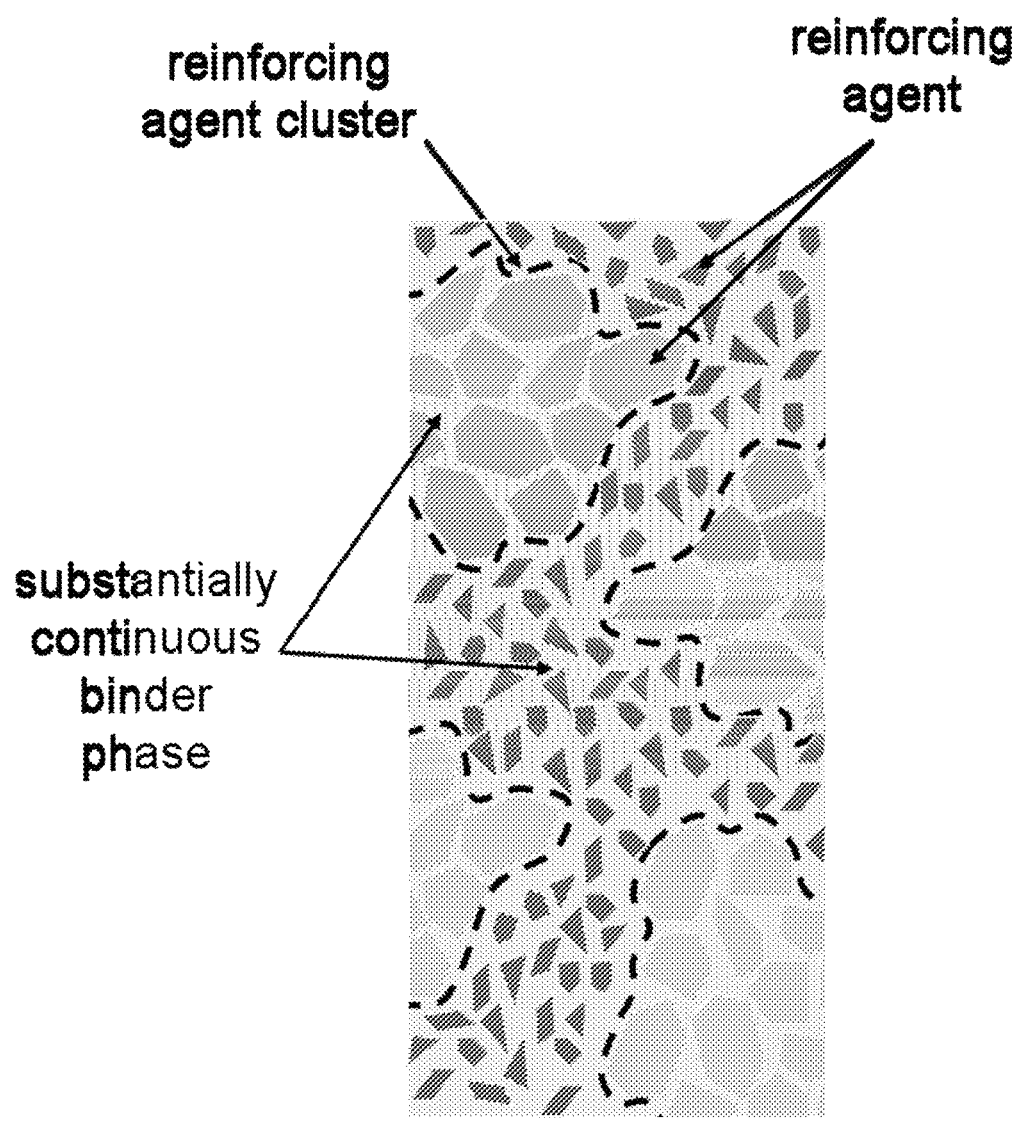
FIG. 3 provides a nonlimiting illustration of a composite comprising reinforcing agent clusters according to the present invention.

In some embodiments, the second reinforcing agent particles may be in the binder phase (not incorporated in the reinforcing agent clusters) in a substantially homogenous distribution. As used herein, substantially homogenous distribution refers to a distribution where the distances from one particle to its nearest neighbors are substantially equal, e.g., about 90% or greater of the particles being about the same distance from its nearest neighbor +/− about 25%. FIGS. 1 and 3 provide nonlimiting illustrations of composites comprising a substantially continuous binder phase; reinforcing agent clusters comprising a plurality of first reinforcing agent particles; and a plurality of second reinforcing agent particles distributed substantially homogeneously in the binder phase and substantially not incorporated in the reinforcing agent clusters.

Figure 4:
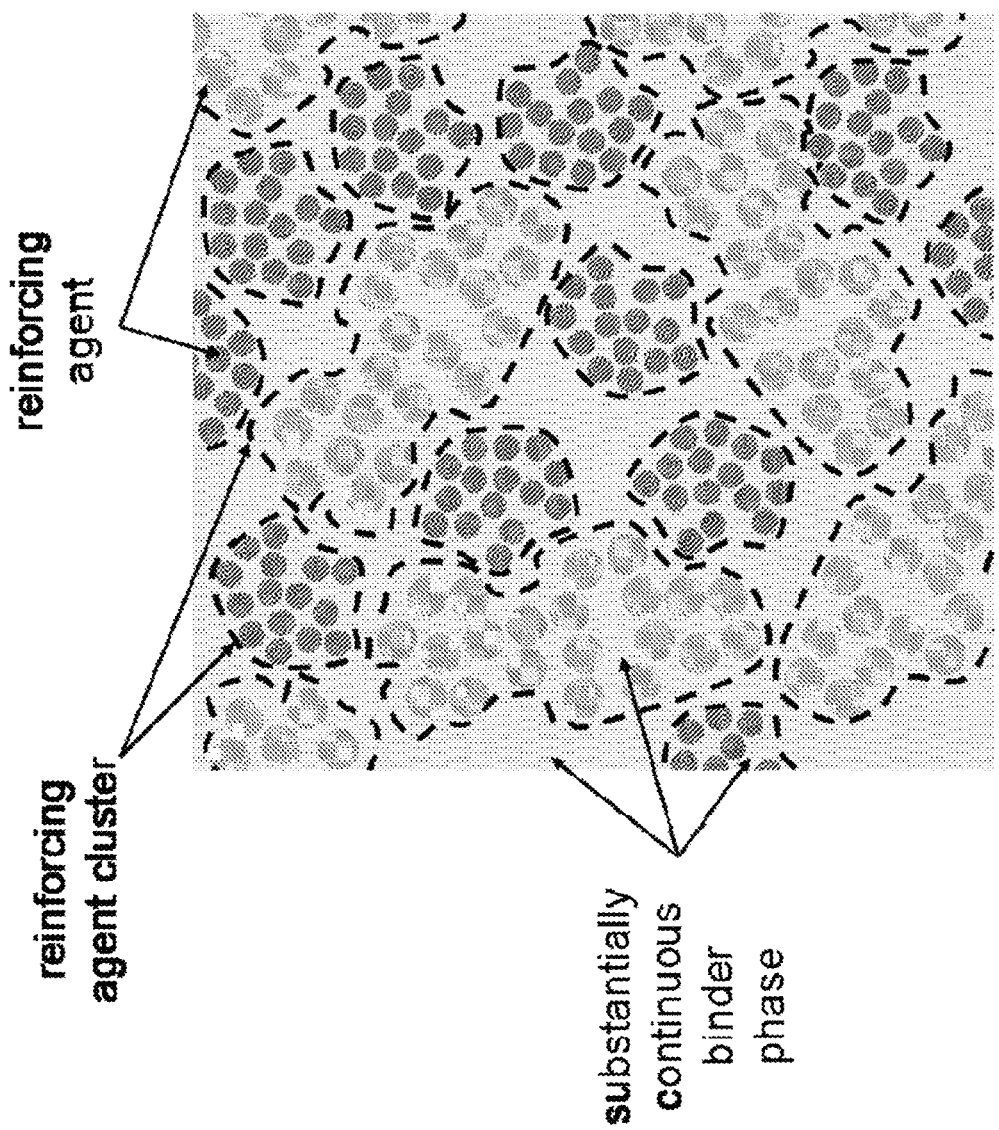
FIG. 4 provides a nonlimiting illustration of a composite comprising reinforcing agent clusters according to the present invention.

In some embodiments, the second reinforcing agent particles may themselves be porous reinforcing agent clusters to form a composite with two different reinforcing agent clusters, e.g., as illustrated in FIG. 4. In some embodiments, a composite may comprise a third reinforcing agent in the binder phase and not substantially incorporated in a first reinforcing agent cluster or a second reinforcing agent cluster.

In some embodiments, reinforcing agent particles (first, second, and so on) may have a polymodal size distribution, including, but not limited to, bimodal, trimodal, and so on. In some embodiments, the first, second, and so on reinforcing agents may be differentiated by shape, size, chemical composition, microstructure, crystal structure, or any combination thereof.

Some embodiments may involve producing a composite precursor comprising first porous reinforcing agent clusters, a binder material, optionally second reinforcing agent particles (or optionally as porous clusters), and optionally any additional reinforcing agent particles (or optionally as porous clusters). In some embodiments, producing the composite precursor may involve shaking and/or vibrating to achieve a desired distribution of each within the final composite.

Some embodiments may involve forming a composite from the composite precursor. In some embodiments, forming a composite may involve heating any of the composite precursor to a temperature at or greater than the melting point of the binder material. In some embodiments, forming a composite may involve heating any of the composite precursor to a temperature less than the melting point of any of the reinforcing agents in the composite precursor. Suitable temperatures may range from a lower limit of about 815° C. (1500° F.), 955° C. (1750° F.), 1090° C. (2000° F.), or 1230° C.

(2250° F.) to an upper limit of about 1785° C. (3250° F.), 1650° C. (3000° F.), 1510° C. (2750° F.), or 1370° C. (2500° F.), wherein the temperature may range from any lower limit to any upper limit and encompass any subset therebetween.

In some embodiments, forming a composite may involve applying pressure. Suitable pressures may range from a lower limit of above atmospheric pressure, about 110 kPa, 500 kPa, 1 MPa, 10 MPa, 100 MPa, or 1 GPa, to an upper limit of about 10 GPa, 5 GPa, 1 GPa, 100 MPa, 10 MPa, or 1 MPa, and wherein the pressure may range from any lower limit to any upper limit and encompass any subset therebetween.

It should be noted that when low-temperature bonding materials are used for the porous reinforcing agent precursors, the low-temperature bonding materials may pyrolyze, decompose, evaporate, or any combination thereof. As such, the reinforcing agent particles may shift during the heating process. One skilled in the art, with the benefit of this disclosure, should understand when low-temperature bonding materials may not be appropriate for forming composites. By way of nonlimiting example, if pressure is used to form a composite, low-temperature bound porous reinforcing agent clusters may shift more dramatically than if pressure were not applied.

The concentration and/or relative ratio of porous reinforcing agent clusters, binder material, and optionally the reinforcing agent particles may depend on the application. One skilled in the art should understand the concentrations and/or relative ratios with which to incorporate the components to achieve a desired final composite. In some embodiments, the final composite may include reinforcing agent clusters at a concentration ranging from a lower limit of about 5%, 10%, 15%, or 25% to an upper limit of about 75%, 50%, 40%, 30%, or 25% by volume of the composite, and wherein the concentration of the reinforcing agent clusters may range from any lower limit to any upper limit and encompass any subset therebetween. In some embodiments, the final composite may include reinforcing agent particles at a concentration ranging from a lower limit of about 5%, 10%, 15%, or 25% to an upper limit of about 75%, 50%, 40%, 30%, or 25% by volume of the composite, and wherein the concentration of the reinforcing agent particles may range from any lower limit to any upper limit and encompass any subset therebetween. In some embodiments, the final composite may include a ratio of reinforcing agent clusters to reinforcing agent particles (not clustered) ranging from about 10:90 to about 90:10 by weight. By way of nonlimiting example, a composite may include diamond reinforcing agents such that clusters of large size diamond reinforcing agents and nonclustered small size diamond reinforcing agents are present in ratios of about 70:30 to 90:10 by weight.

Figure 9:
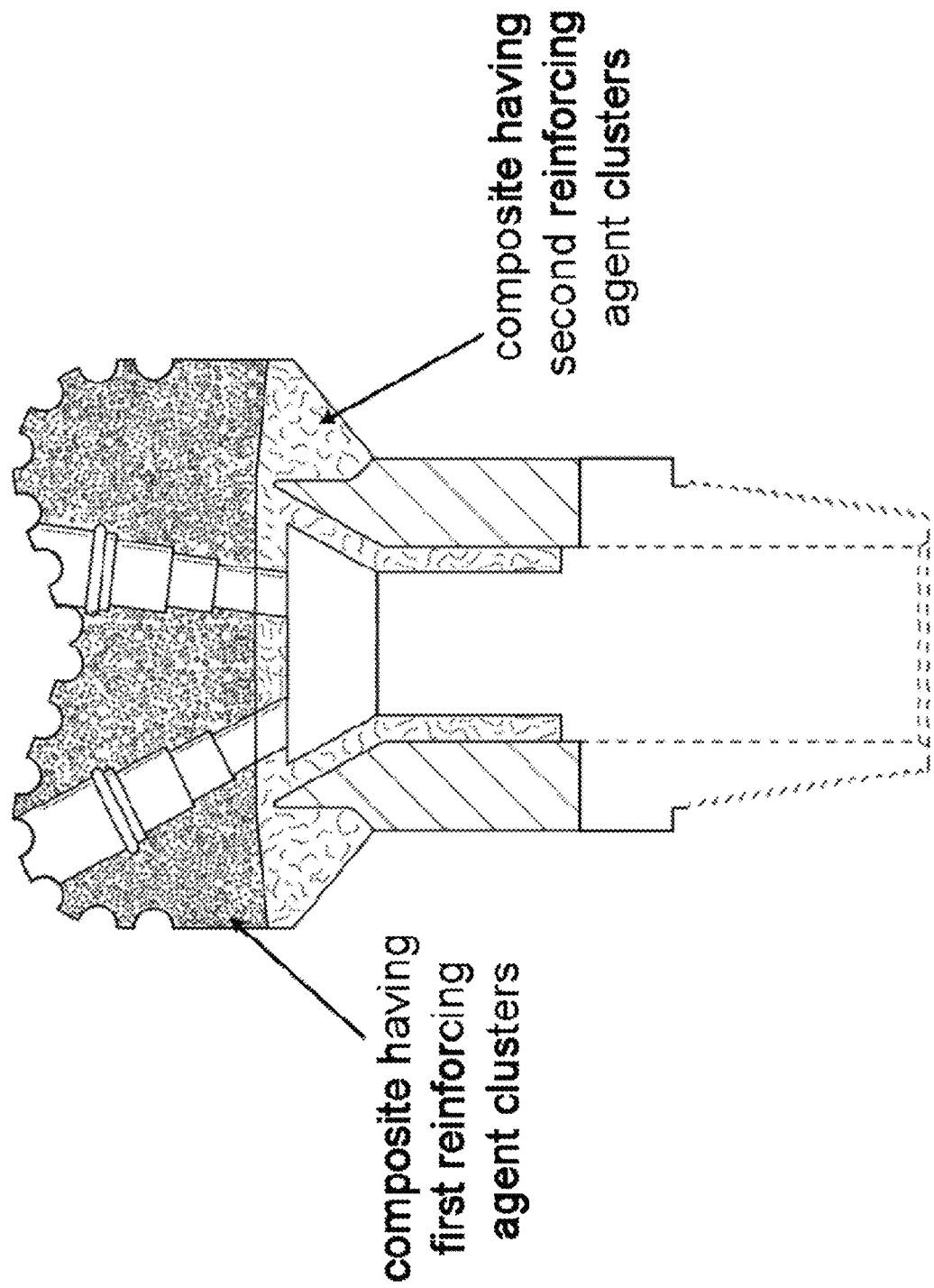
FIG. 9 provides a nonlimiting illustration of a fixed cutter drill bit cross-section where a first portion of the drill bit body comprises first reinforcing agent clusters and a second portion of the drill bit body comprises second reinforcing agent clusters according to the present invention.

In some embodiments, forming a composite may involve a mold. In some embodiments, a mold may be a drill bit mold. In some embodiments, the composite precursor may be homogeneously blended through the mold. In some embodiments, the composite precursor may be layered in the mold with other composite precursors, e.g., a different composite precursor described herein and/or composite precursors not including porous reinforcing agent clusters. By way of nonlimiting example, it may be advantageous to layer wear-resistant clusters to correspond to at or near a blade surface and tough clusters towards the interior of the blade to reduce blade cracking. By way of nonlimiting example, in some embodiments as illustrated in FIG. 9, a fixed cutter drill bit may have a first portion of the body that includes first reinforcing agent clusters (e.g., for enhanced wear-resistance) and a second portion of the body that includes second reinforcing agent clusters (e.g., for enhancing toughness).

In some embodiments, a layered composite may comprise any of the composites described herein in at least a portion of a layer of the layered composite. It should be noted that layer does not imply a thickness. In some embodiments, layers and/or layering may be achieved using 3-D printing of the composite precursor into a mold, on a surface, and/or to create a 3-D structure; hand layering of the composite precursor in a mold or on a surface; metered addition of the composite precursor to a mold or on a surface; or any combination thereof.

Figure 10:
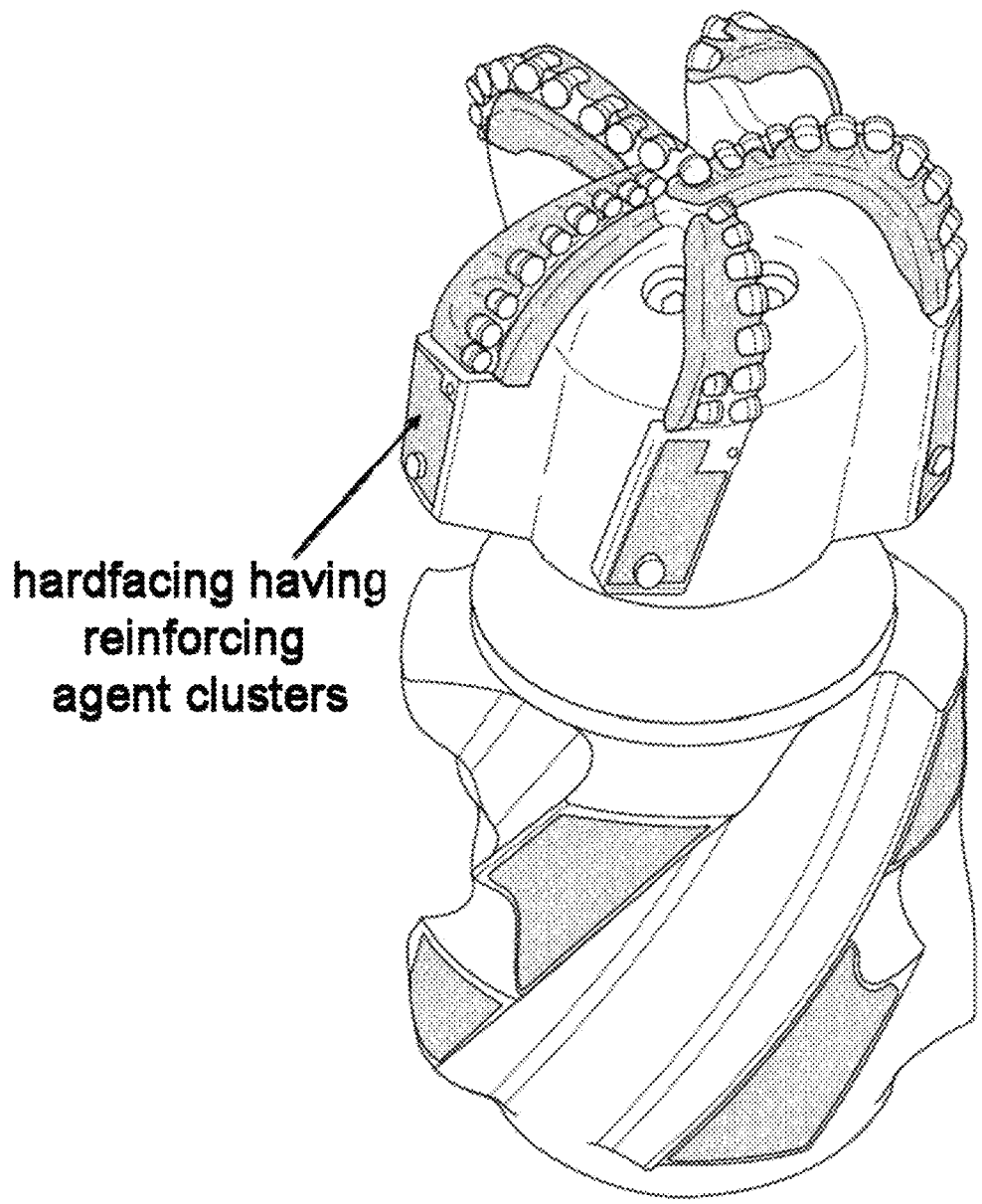
FIG. 10 provides a nonlimiting illustration of a fixed cutter drill bit with a sleeve having some surfaces coated with hardfacing having reinforcing agents according to the present invention.

In some embodiments, any of the composites described herein may be a coating on a substrate. By way of nonlimiting example, any of the composites described herein may be used for hardfacing. In some embodiments, any of the composites described herein may be a hardfacing on at least a portion of a downhole tool or component thereof. In some embodiments, like hardfacing, for porous reinforcing agent clusters to maintain their structural integrity, i.e., stay clustered with at least one infiltration path, a high-temperature bonding material may be preferred to a low-temperature bonding material. In hardfacing, the binder material and porous reinforcing agent clusters may be included in the rod, or rope. The binder material may have several functions in hardfacing including, but not limited to, infiltrating the porous reinforcing agent clusters, wetting the substrate being hardfaced, bonding porous reinforcing agent clusters to the substrate being hardfaced, providing the interface between the substrate being hardfaced and the hardfacing, or any combination thereof. By way of nonlimiting example, in some embodiments as illustrated in FIG. 10, a fixed cutter drill bit and sleeve may have a hardfacing thereon that includes reinforcing agent clusters such that the hardfacing is only on portions of the fixed cutter drill bit and sleeve.

In some embodiments, polycrystalline diamond cutters may comprise composites described herein. By way of nonlimiting example, porous reinforcing agent clusters comprising diamond reinforcing agents may be used as part of the diamond table of a polycrystalline diamond cutter. Generally, the porous reinforcing agent clusters may be applied to the substrate, then under heat and pressure the binder phase, e.g., cobalt, iron, or nickel, within the substrate, e.g., tungsten carbide in a cobalt, iron, or nickel binder phase, may infiltrate the porous reinforcing agent clusters. As this is a high-temperature, high-pressure process, one skilled in the art would understand that high-temperature bonding materials may be preferable in the porous reinforcing agent clusters. Further, it may be advantageous to match the high-temperature bonding material to the binder phase of the substrate.

Figure 11:
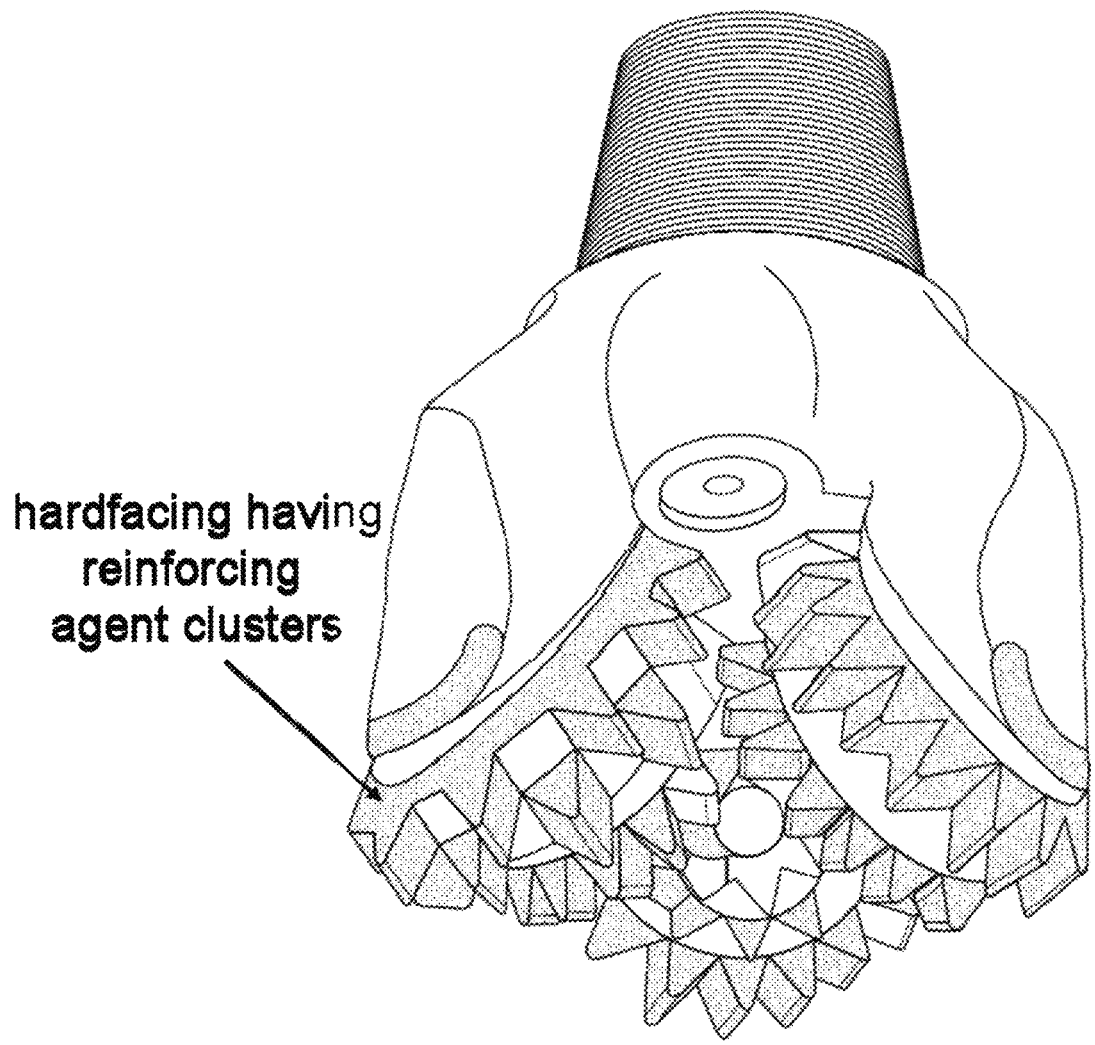
FIG. 11 provides a nonlimiting illustration of a roller cone drill bit having some surfaces coated with hardfacing having reinforcing agents according to the present invention.

Examples of suitable downhole tools which may include any of the composites described herein may include, but not be limited to, fixed cutter drill bits, rotary cone drill bits, corehead bits, and the like, any component thereof, or any hybrid thereof. Examples of components of drill bits may include, but not be limited to, cutting elements, cutter blades, cutter pockets, junk slots, arms, cutter cone assemblies, milled teeth, and the like. By way of nonlimiting example, in some embodiments as illustrated in FIG. 11, a roller cone drill bit may have a hardfacing thereon that includes reinforcing agent clusters such that the hardfacing is only on portions of the roller cone drill bit.

In some embodiments, a drill bit may comprise a bit body and at least one cutting element for engaging a formation. The drill bit may further comprise cutter blade disposed on the bit body; a cutter pocket disposed on the cutter blade; a junk slot disposed on the bit body and forming a channel between two cutter blades; an arm disposed on the bit body; a cutter cone assembly disposed on the arm; a milled tooth disposed on the cutter cone assembly; a barrel; a coring barrel; a coring hole; or any combination thereof.

In some embodiments, a downhole tool comprising any of the composites described herein may be used in a subterranean formation. By way of nonlimiting example, some embodiments involving providing a drill bit comprising any of the composites described herein and drilling at least a portion of a wellbore in a subterranean formation with the drill bit.

In some embodiments, a composite may include a substantially continuous binder phase and a first reinforcing agent cluster infiltrated by the binder phase, a nonlimiting example of which is shown in FIG. 2. Generally, the first reinforcing agent cluster may include a plurality of first reinforcing agent particles.

In some embodiments, a composite may include a plurality of layers. In some embodiments, at least a portion of at least one of the layers may include a substantially continuous binder phase and a first reinforcing agent cluster. Generally, the first reinforcing agent cluster may include a plurality of first reinforcing agent particles and at least a portion of the binder phase.

Some embodiments may include providing a porous reinforcing agent cluster comprising a plurality of first reinforcing agent particles and a bonding material; combining the porous reinforcing agent cluster and a binder material; and forming a composite comprising a substantially continuous binder phase and a first reinforcing agent cluster. In the composite, at least a portion of the binder phase infiltrates the first reinforcing agent cluster.

Some embodiments may include providing a first reinforcing agent particle, a second reinforcing agent particle, and a binder material; forming a first porous reinforcing agent cluster comprising the first reinforcing agent particle and a bonding material; and forming a composite from the first porous reinforcing agent cluster, the second reinforcing agent particle, and the binder material.

Some embodiments may include mixing a plurality of first reinforcing agent particles and a high-temperature bonding material; and heating to a temperature at or above a softening temperature for the high-temperature bonding material thereby yielding a plurality of porous reinforcing agent clusters having at least one path for infiltration.

In some embodiments, a porous reinforcing agent cluster may include a high-temperature bonding material and a plurality of first reinforcing agent particles in a cluster configuration mechanically bound at a plurality of contact points by the high-temperature bonding material such that the porous reinforcing agent cluster comprises at least one path for infiltration.

In some embodiments, a drill bit may include at least one cutting element for engaging a formation and a bit body, at least a portion of which comprises a composite that comprises a substantially continuous binder phase and a first reinforcing agent cluster, wherein the binder phase infiltrates the first reinforcing agent cluster.

Some embodiments may include providing a drill bit that comprises at least one cutting element for engaging a formation and a bit body, at least a portion of the bit body comprising a composite that comprises a substantially continuous binder phase and a first reinforcing agent cluster, wherein the binder phase infiltrates the first reinforcing agent cluster; and drilling at least a portion of a wellbore in a subterranean formation with the drill bit.

To facilitate a better understanding of the present invention, the following examples of preferred embodiments are given. In no way should the following examples be read to limit, or to define, the scope of the invention.

EXAMPLES

Example 1

Figure 5:
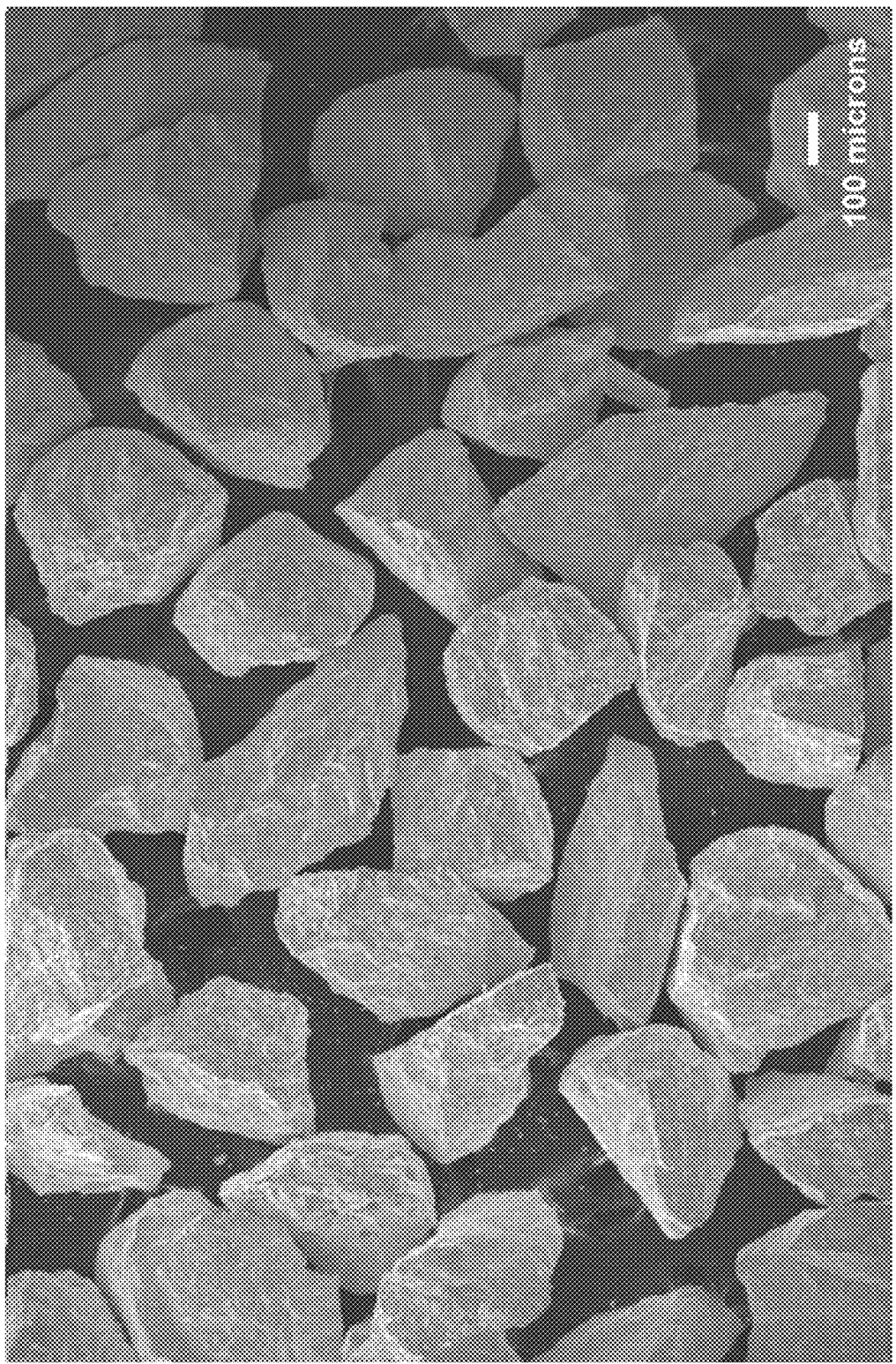
FIG. 5 provides a scanning electron micrograph of tungsten carbide reinforcing agent particles.
Figure 6:
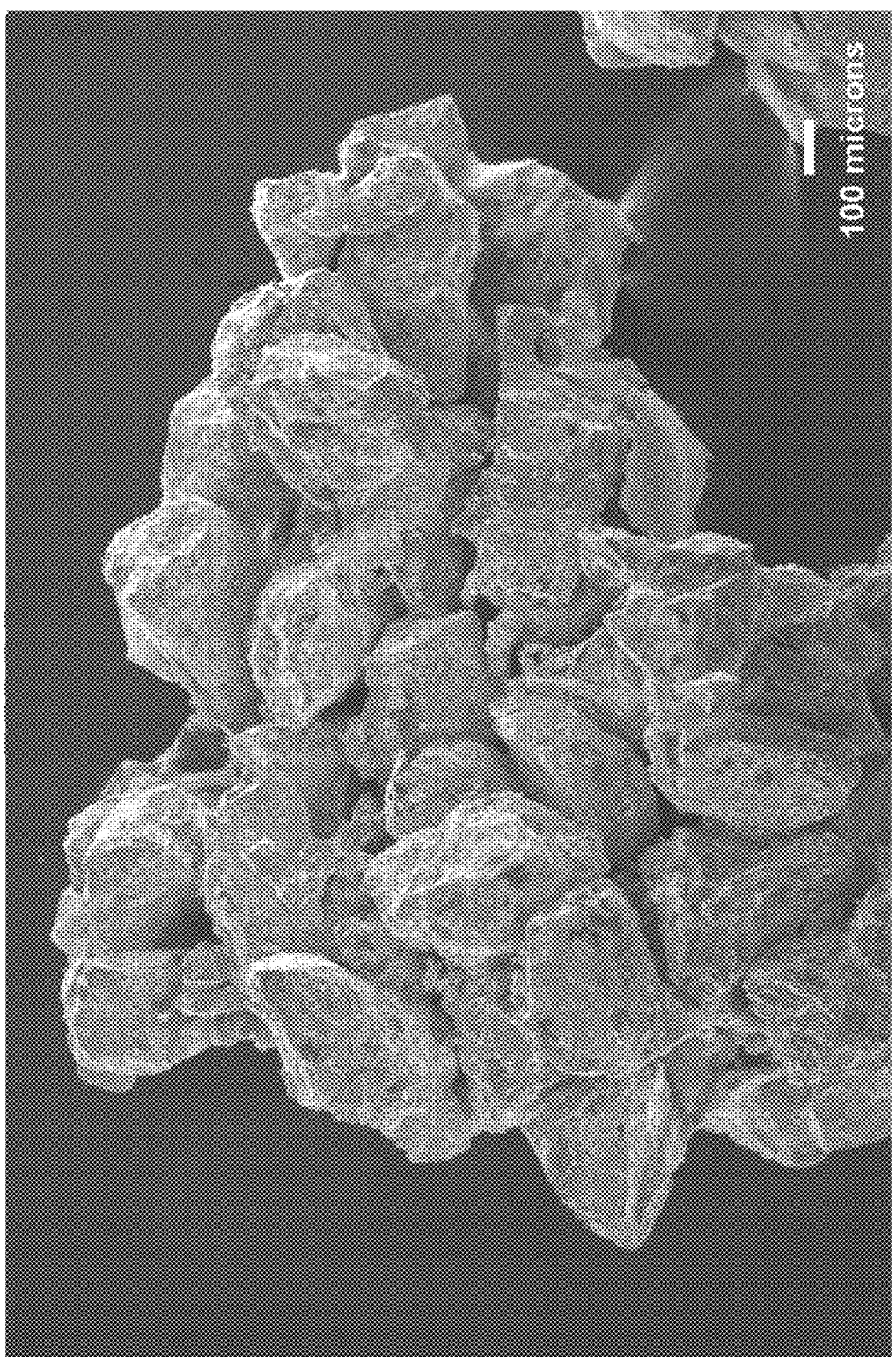
FIG. 6 provides a scanning electron micrograph of a porous reinforcing agent cluster formed from tungsten carbide reinforcing agent particles according to the present invention.

Porous tungsten carbide clusters were formed by blending +60 mesh tungsten carbide particles with 5% by volume copper-manganese-phosphorus binder powder. A scanning electron micrograph of the tungsten carbide particles is shown in FIG. 5. The resultant blend was placed into a graphite pin mold. The blend was not vibrated during loading. The blend in the pin was heated to about 1175° C. (2150° F.). The resultant bonded material was removed from the pin and crushed with a mortar and pestle then screened at +40 mesh (no top size screening). One of the resultant porous tungsten carbide clusters is shown in FIG. 6.

Figure 7:
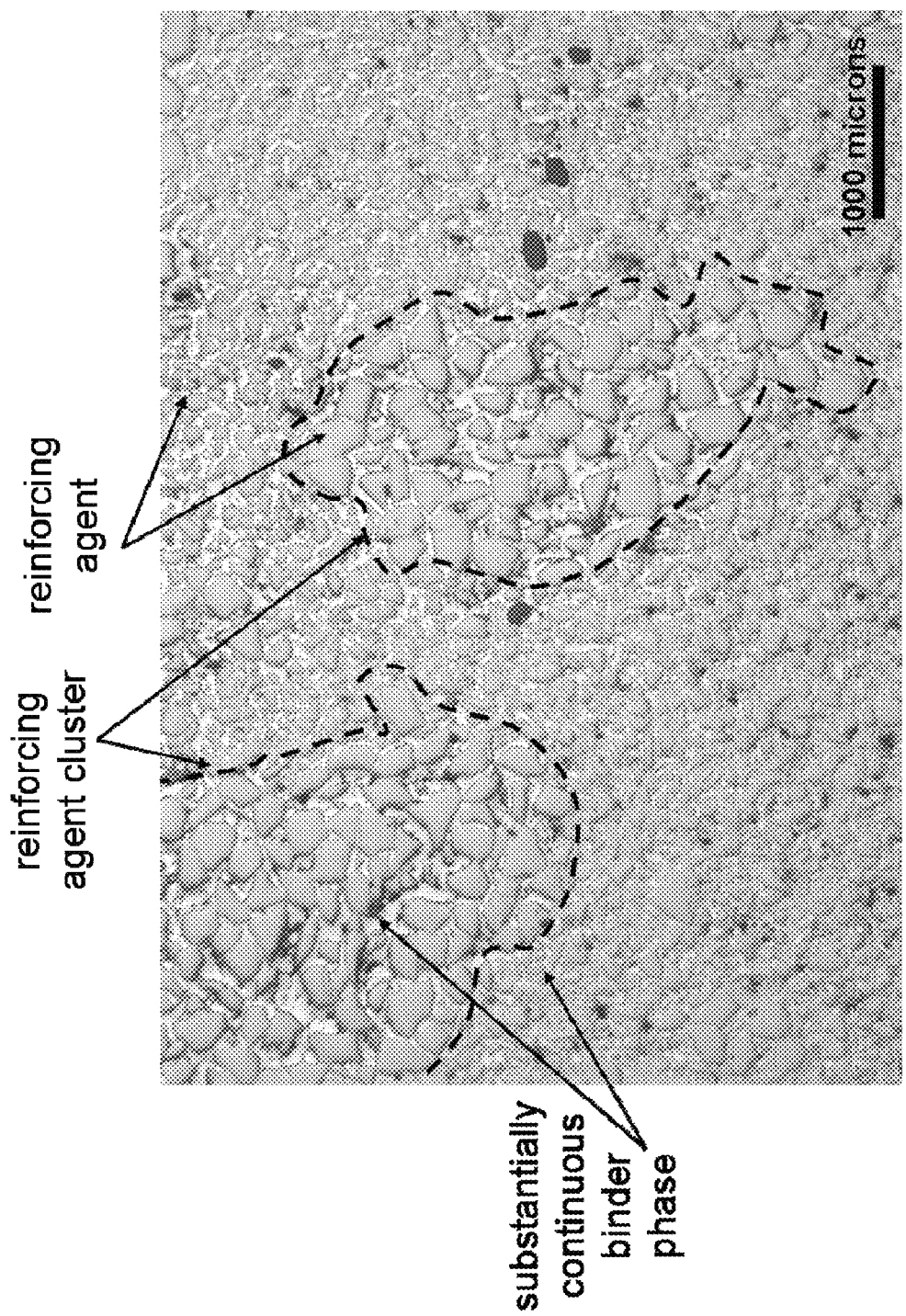
FIG. 7 provides an optical micrograph of a composite formed from tungsten carbide reinforcing agent clusters according to the present invention.
Figure 8:
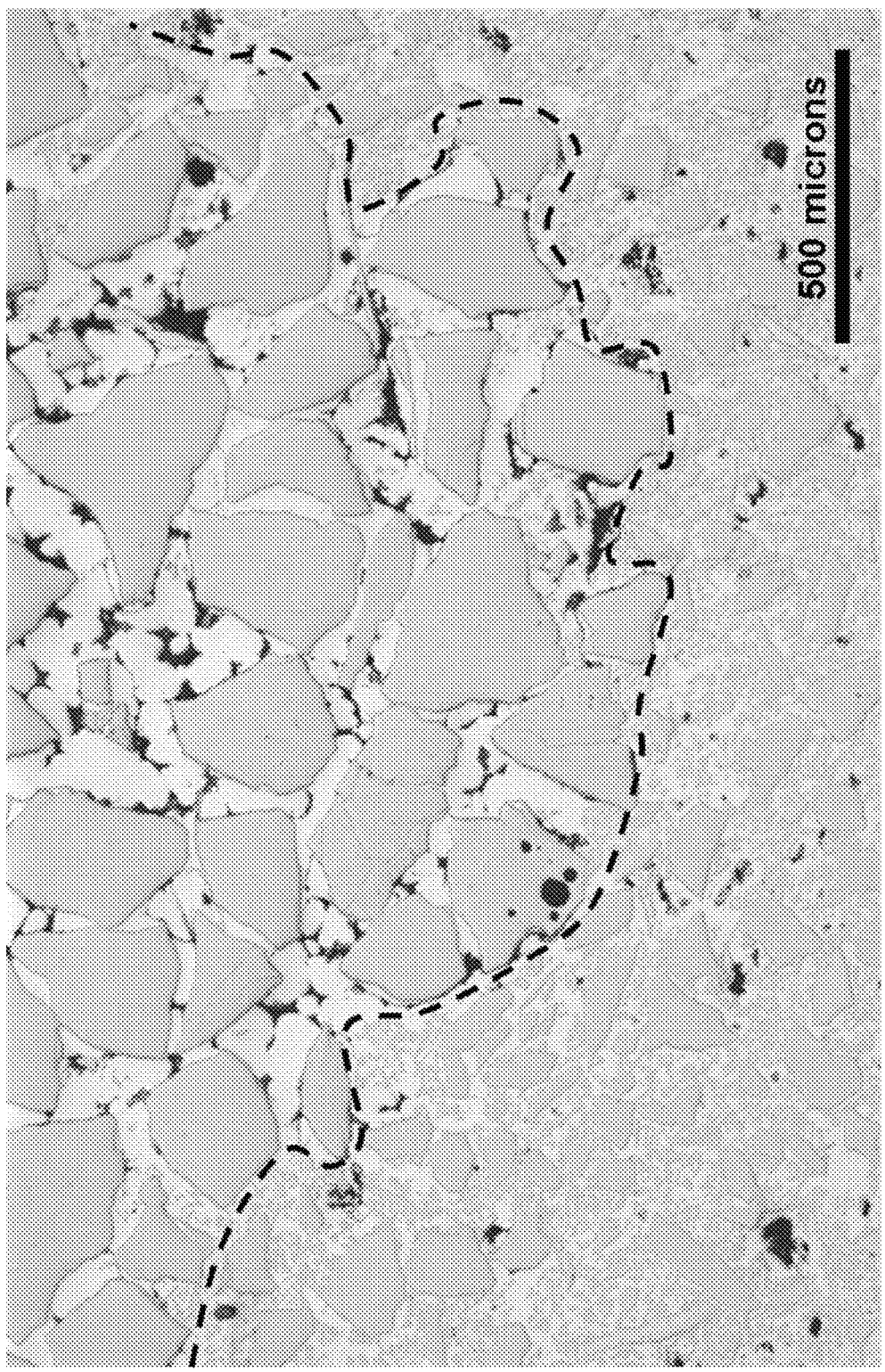
FIG. 8 provides an optical micrograph of a composite formed from tungsten carbide reinforcing agent clusters according to the present invention.

The porous tungsten carbide clusters were then blended with a second reinforcing agent particle, D63 (tungsten carbide, available from HC Stark), and loaded into another pin with vibration. The binding material of Belmont binder (copper-manganese-nickel-zinc, available from Belmont Metals, Inc.) and Harris flux (borax and boric acid, available from Harris Products) were added, and the pin was heated to 1175° C. (2150° F.) and held for 10 minutes. After cooling the pin was mounted and polished for microstructure analysis. FIGS. 7 and 8 provide optical micrographs of the resultant composite showing the substantially continuous binder material infiltrating tungsten carbide clusters.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A composite comprising:
   a substantially continuous binder phase;
   a plurality of first reinforcing agent clusters distributed throughout and at least partially infiltrated by the binder phase, the first reinforcing agent clusters comprising a plurality of first reinforcing agent particles; and
   a plurality of non-clustered second reinforcing agent particles distributed throughout the binder phase, such that a weight ratio of the first reinforcing agent clusters to the non-clustered second reinforcing agent particles ranges from 10:90 to 90:10.

2. The composite of claim 1, wherein the first reinforcing agent cluster has a dimension in at least one direction of about 10 nm or greater.

3. The composite of claim 1, wherein the first reinforcing agent cluster has a dimension in at least one direction ranging from about 10 nm to about 10 microns.

4. The composite of claim 1, wherein the first reinforcing agent cluster has a dimension in at least one direction ranging from about 10 microns to about 1 mm.

5. The composite of claim 1 further comprising:
   a plurality of second reinforcing agent clusters distributed throughout and at least partially infiltrated by the binder phase, the second reinforcing agent clusters comprising a plurality of third reinforcing agent particles and at least a portion of the binder phase.

6. The composite of claim 1, wherein the non-clustered second reinforcing agent particles are distributed substantially homogeneously through the binder phase and substantially not within the first reinforcing agent cluster.

7. The composite of claim 1, wherein the first reinforcing agent particles have a different particle size distribution than the non-clustered second reinforcing agent particles.

8. The composite of claim 1, wherein the first reinforcing agent particles and/or the non-clustered second reinforcing agent particles have a polymodal particle size distribution.

9. The composite of claim 1, wherein the first reinforcing agent particles have a different chemical composition than the non-clustered second reinforcing agent particles.

10. The composite of claim 1, wherein the first reinforcing agent particles and/or the non-clustered second reinforcing agent particles comprises a reinforcing agent precursor.

11. A composite comprising:
    a plurality of layers wherein at least a portion of a first layer comprises
    a substantially continuous binder phase, and
    a plurality of first reinforcing agent clusters comprising a plurality of first reinforcing agent particles and at least a portion of the binder phase, and
    a plurality of non-clustered second reinforcing agent particles distributed individually throughout the binder phase, such that a weight ratio of the first reinforcing agent clusters to the non-clustered second reinforcing agent particles ranges from 10:90 to 90:10.

12. The composite of claim 11, wherein the non-clustered second reinforcing agent particles are distributed substantially homogeneously through the binder phase and substantially not within the first reinforcing agent cluster.

13. The composite of claim 11 further comprising:
    a plurality of second reinforcing agent clusters distributed throughout and at least partially infiltrated by the binder phase, the second reinforcing agent clusters comprising a plurality of third reinforcing agent particles and at least a portion of the binder phase.

14. The composite of claim 11, wherein the first reinforcing agent cluster has a dimension in at least one direction of about 10 nm or greater.

15. The composite of claim 11, wherein the first reinforcing agent comprises a reinforcing agent precursor.

16. A method comprising:
    providing a first porous reinforcing agent cluster comprising a plurality of first reinforcing agent particles and a bonding material;
    combining a plurality of the first porous reinforcing agent cluster, a plurality of non-clustered second reinforcing agent particles, and a binder material, such that a weight ratio of the first reinforcing agent clusters to the second reinforcing agent particles ranges from 10:90 to 90:10; and
    forming a composite comprising a substantially continuous binder phase with the plurality of the first reinforcing agent clusters and the plurality of the non-clustered second reinforcing agent particles distributed throughout the binder phase, wherein at least a portion of the binder phase infiltrates the first reinforcing agent cluster.

17. The method of claim 16, wherein the bonding material comprises at least one selected from the group consisting of: a resin, a tackifier, a polymer, and any combination thereof.

18. The method of claim 16, wherein the bonding material has the same chemical composition as the binder material.

19. The method of claim 16, wherein the binder material has a melting point less than about a first reinforcing agent particle melting point.

20. The method of claim 16, wherein the first porous reinforcing agent cluster comprises at least one infiltration path.

21. The method of claim 16, wherein combining involves infiltrating the first porous reinforcing agent cluster with the binder material.

22. The method of claim 16, wherein forming the composite involves heating to a temperature less than about a first reinforcing agent particle melting point.

23. A drill bit comprising:
    a bit body, at least a portion of which comprises a composite that comprises a substantially continuous binder phase with a plurality of first reinforcing agent clusters and a plurality of non-clustered second reinforcing agent particles distributed throughout the binder phase, such that a weight ratio of the first reinforcing agent clusters to the non-clustered second reinforcing agent particles ranges from 10:90 to 90:10, wherein the binder phase infiltrates the first reinforcing agent cluster; and
    at least one cutting element for engaging a formation.

24. The drill bit of claim 23, wherein the composite is a hardfacing on at least a portion of the exterior surface of the bit body.

25. The drill bit of claim 23, wherein the at least one cutting element comprises the composite.

26. The drill bit of claim 25, wherein the first reinforcing agent cluster comprises diamond particles.

* * * * *